United States Patent [19]

Carmine

[11] Patent Number: 4,679,385
[45] Date of Patent: Jul. 14, 1987

[54] ATTACHMENT FOR LAWN TRIMMER

[76] Inventor: Benjamin C. Carmine, 415 Shadow Creek Dr., Seabrook, Tex. 77586

[21] Appl. No.: 812,757

[22] Filed: Dec. 23, 1985

[51] Int. Cl.⁴ .............................................. A01D 34/84
[52] U.S. Cl. ...................................... 56/16.9; 56/17.5
[58] Field of Search ..................... 56/12.7, 17.2, 16.7, 56/16.9, 17.4, 17.5

[56] References Cited

U.S. PATENT DOCUMENTS

| | | |
|---|---|---|
| D. 168,749 | 2/1953 | McMillan et al. |
| D. 188,863 | 11/1960 | Bishop. |
| 2,612,741 | 10/1952 | McKay ................. 56/16.9 |
| 2,672,002 | 3/1954 | Nelson ................. 56/16.9 |
| 2,708,335 | 5/1955 | Newton. |
| 2,827,748 | 3/1958 | Simpson ................. 56/16.9 |
| 2,938,323 | 5/1960 | Livingston et al. ............. 56/17.2 |
| 2,977,740 | 4/1961 | King ................. 56/17.2 |
| 3,191,368 | 6/1965 | Hidalgo. |
| 3,197,951 | 8/1965 | Zick. |
| 3,350,864 | 11/1967 | Sheps et al. ................. 56/16.9 |
| 3,672,139 | 6/1972 | Duran et al. ................. 56/16.9 |
| 3,774,379 | 11/1973 | Mizobata et al. ................. 56/16.9 |
| 3,807,151 | 4/1974 | Rosenthal et al. ................. 56/16.9 |
| 4,185,381 | 1/1980 | Palmirri et al. ................. 56/12.7 |
| 4,224,784 | 9/1980 | Hansen et al. ................. 56/16.9 |
| 4,229,882 | 10/1980 | Chartier. |
| 4,316,325 | 2/1982 | Brucker ................. 56/12.7 |
| 4,360,971 | 11/1982 | Fellmann. |
| 4,364,435 | 12/1982 | Tuggle et al. ................. 56/17.2 |

Primary Examiner—Paul J. Hirsch
Attorney, Agent, or Firm—Gunn, Lee & Jackson

[57] ABSTRACT

An attachment for temporarily converting a flexible cord-type lawn trimmer to a lawn edger is disclosed. The attachment comprises a base plate for mounting to the housing of the lawn trimmer. The attachment includes an edge guide, a deflection shield, a bracket and wheels mounted to the base plate. The bracket supports a portion of the lawn trimmer housing upon securing the base plate to the lawn trimmer.

9 Claims, 8 Drawing Figures

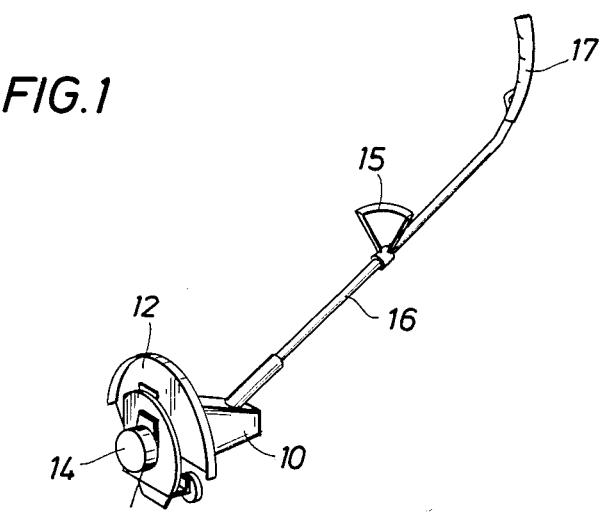
FIG. 1
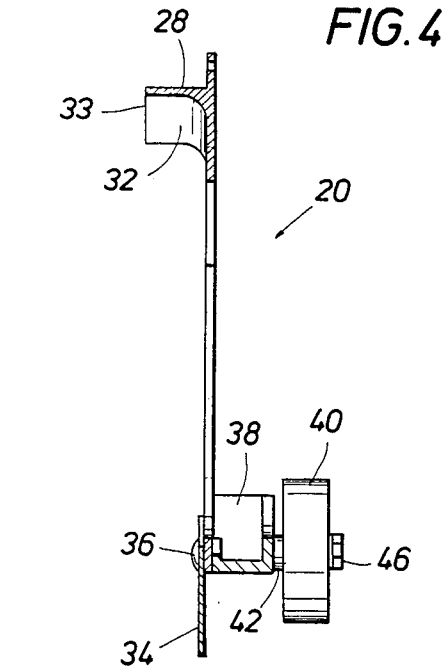
FIG. 4
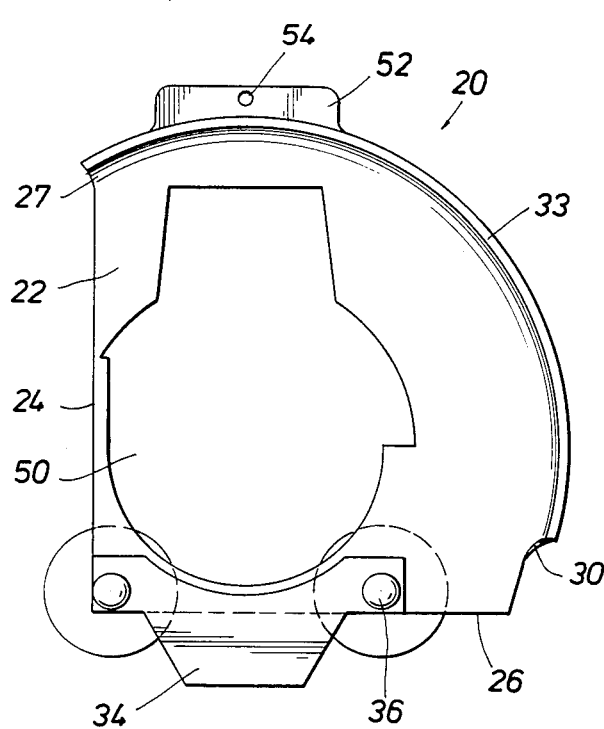
FIG. 2
FIG. 3

ATTACHMENT FOR LAWN TRIMMER

BACKGROUND OF THE DISCLOSURE

The present invention is directed to an attachment for a lawn trimmer, particularly, to an attachment for converting a flexible line cord lawn trimmer to a lawn edger so that the flexible cord of the trimmer may be used for both trimming and edging the lawn.

Lawn edgers, both gasoline and electric powered, have been known and used for many years. Line trimmers, for example, nylon cord trimmers, which have the capability of being used as either a lawn edger or a lawn trimmer are also known to the prior art. However, nylon cord trimmers presently available are difficult to use as lawn edgers because the user must orient the line trimmer so that the orbit of the cutter line is perpendicular to the ground and parallel to the sidewalk or the curb being edged. Furthermore, the user must position and hold the line trimmer, while in motion, a sufficient distance above the ground and away from the concrete so that the nylon cord does not strike the concrete or the ground with such force that it wears abnormally.

Typically, nylon cord trimmers presently available include a motor housing having a shaft extending from the housing at an acute angle. A D-shaped handle is generally located about the midpoint of the shaft and a pistol-grip handle having a trigger, which must be depressed to electrically energize the line trimmer motor, is attached to the terminal end of the shaft. When using this type of device as a lawn edger, the housing is rotated so that the grip portion of the handle is facing upwardly. Also, the shaft of the line trimmer must be held by the D-shaped handle in a position so that the motor housing is oriented such that the orbital plane of the cutter line is perpendicular to the ground. This typically requires the user to stoop over and grasp the D-shaped handle with one hand and hold the pistol-grip of the handle in the other hand to keep the line trimmer properly oriented for edging. Since the pistol-grip of the handle is facing upwardly in this position, the user cannot depress the dead-man type switch with his index finger and must therefore press the switch with his thumb. While in this rather awkward position, the user must also walk along the lawn edge, at all times attempting to keep the line trimmer housing properly oriented so that a straight edge can be cut. This is extremely difficult to accomplish and very tiring for the user to maintain such an awkward position for an extended period of time in order to edge the lawn.

Attachments for line trimmers are available as exemplified by U.S. Pat. No. 4,224,784 to Hanson, et al., and other conversion systems disclosed therein. The Hanson device comprises an attachment incorporating a collar with support legs attached to it and wheels attached to the support legs. A U-shaped brace is attached to the support legs holding them at an angle to each other. The collar is positioned about the shaft extending from the line trimmer motor housing. The line trimmer is oriented so that its face is perpendicular to the ground. The collar is secured to the shaft with the head of the line trimmer between the ends of the U-shaped brace and spaced above the ground.

The prior art lawn edging devices have several disadvantages which are overcome with a novel lawn edger attachment of the present disclosure. Edging with the attachment of the present disclosure mounted on a nylon cord trimmer produces a straighter, wider, deeper and cleaner cut than edging with a hand held line trimmer or a conventional metal blade edger. The apparatus of the present disclosure is provided with a downwardly extending edge guide which extends into the trench separating the edge of the sidewalk or curb from the lawn. The edge guide contacts and slides along the vertical surface of the sidewalk or curb, enabling the user to form a cut which is substantially parallel to the sidewalk or curb.

Another significant advantage provided by the apparatus of the present disclosure is safety. Most debris from cutting, including grass, dirt, and small hard objects removed from the area being edged, is deposited back on the lawn, rather than flying onto the sidewalk, street or into the operator's face, eyes or other exposed areas of the body. When edging is performed with a nylon cord trimmer without a deflection shield, flying debris presents a serious danger to the operator and/or passersby. The apparatus of the present disclosure includes a curved deflection shield which directs debris toward the lawn and away from the operator. In addition, when using the present apparatus, the operator walks beside, not behind the lawn edger, further reducing the chance of personal injury.

A further advantage of the apparatus of the present disclosure is the ease of temporarily converting a lawn trimmer into a lawn edger by attaching the apparatus of the present disclosure to the lawn trimmer by means of a single wing nut. The usefulness of the lawn trimmer as a trimmer is not impaired or diminished when the edging apparatus is detached from the lawn trimmer.

SUMMARY OF THE INVENTION

The lawn edger attachment of the present invention comprises a substantially planar base plate which may be mounted to the base of the trimmer housing of a commercially available flexible line card lawn trimmer. The base plate includes an aperture formed therein which permits the spool and line housing of the lawn trimmer to extend through the aperture and project beyond the surface of the base plate. A deflection shield extends partially about the base plate and terminates at one end to form a cord cutter edge. An edge guide extends downwardly from the base plate from guiding the lawn trimmer along the sidewalk or curb. The edge guide cooperates with a trimmer housing bracket and pair of wheels to form a lower assembly for rolling the line trimmer along the edge of the sidewalk. The nose portion of the trimmer housing is received in the bracket and a bolt and wing nut secure the opposite end of the base plate to the trimmer housing base, and therby securely mounting the base plate to the trimmer housing.

BRIEF DESCRIPTION OF THE DRAWING

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are, therefore, not to be considered limiting of its scope, for the invention may admit to other equally effective embodiments.

FIG. 1 is a perspective view of the invention as attached to a standard nylon cord trimmer converting the trimmer to a lawn edger;

FIG. 2 is a side view of the lawn trimmer attachment of the present invention;

FIG. 3 is an end view of the lawn trimmer attachment of the invention;

FIG. 4 is a sectional view of the lawn trimmer attachment of the invention taken along line 4—4 of FIG. 2;

DETAILED DESCRIPTION OF THE PREFERRED EMBODIMENT

Figure 5:
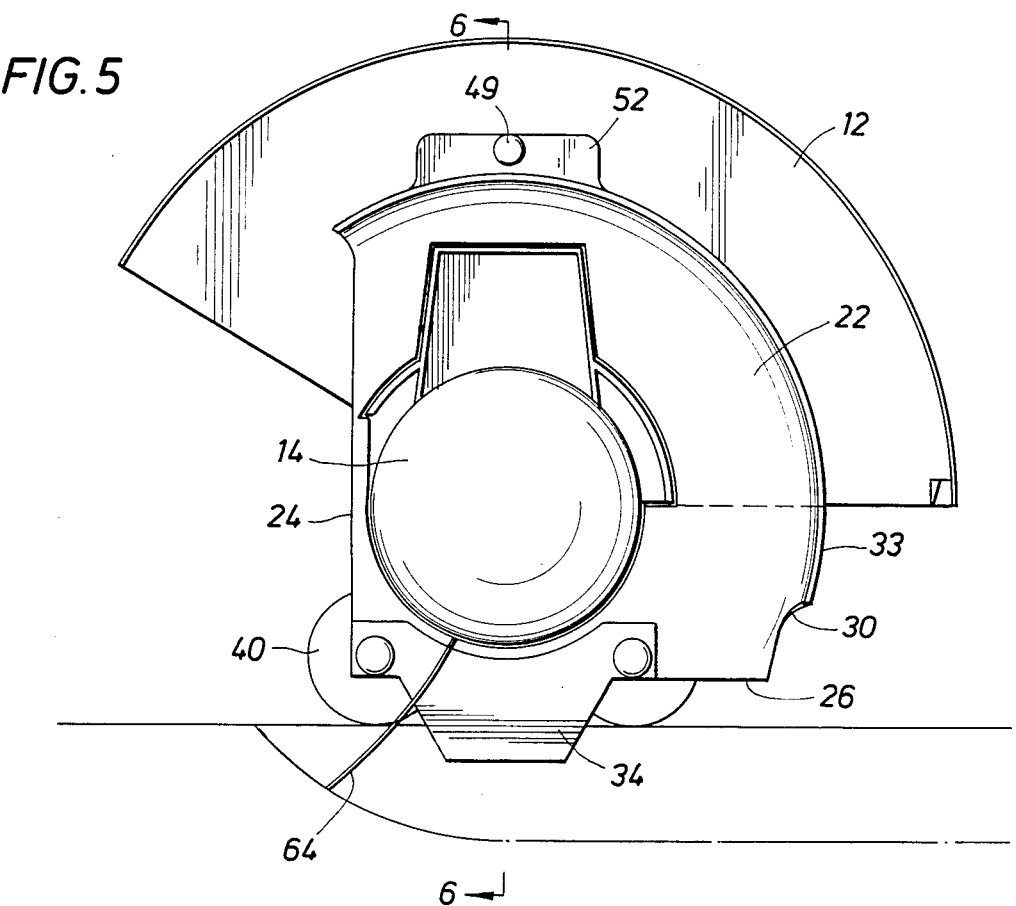
FIG. 5 is a partial, enviromental side view of the lawn trimmer attachment mounted to a conventional lawn trimmer.

Referring first to FIG. 1 of the drawings, the apparatus of the invention is shown mounted to a commercially available portable lawn trimmer. The lawn trimmer includes a trimmer housing 10 suporting a shield plate 12 which is perpendicularly disposed to the trimmer housing 10. A spool and line housing 14 projects outwardly from the flat planar surface of the shield plate 12 and is operatively connected to an electric motor housed within the trimmer housing 10. A shaft 16 extends angularly upwardly from the trimmer housing 10. A D-shaped handle 15 is located at about the midpoint of the shaft 16 providing a convenient hand hold for the operator of the lawn trimmer. A pistol grip handle 17 is also provided at the terminal end of the shaft 16. The description thus far is of a typical, commercially available lawn trimmer which during normal usage has the base and shield plate 12 disposed substantially parallel to the ground for grass trimming purposes. In FIG. 1, the trimmer housing 10 of a conventional line trimmer has been rotated so that it is perpendicular to its usual horizontal operating position relative to the ground. The D-shaped handle 15 has also been rotated 180° on shaft 16.

Referring now to FIG. 2, the apparatus of the present disclosure is generally identified by the reference numeral 20. The apparatus 20 comprises a substantially flat base plate 22. The base plate 22 is defined by a pair of straight edges 24 and 26 which intersect at right angles forming two sides of the base plate 22. A curved edge 27 joins the straight edges 24 and 26 defining a substantially flat pie-shaped surface. An upstanding deflection shield 28, best shown in FIGS. 3 and 4, is formed along the curved edge 27 extending from the distal or terminal end of the edge 24 to the edge 26. The deflection shield 28 terminates adjacent the edge 26 at an angled surface defining a cord cutter edge 30 for trimming or cutting excessive lengths of line cord. The deflection shield 28 is integrally formed with the base plate 22 as shown in FIG. 4 and includes a concave interior surface 32 extending upwardly from the base plate 22 and terminating at the edge 33 of the deflection shield 28. The concave surface 32 of the deflection shield 28 enables grass clippings and debris to be deflected away from the base plate 22, and thereby away from the user of the lawn trimmer.

Figure 6:
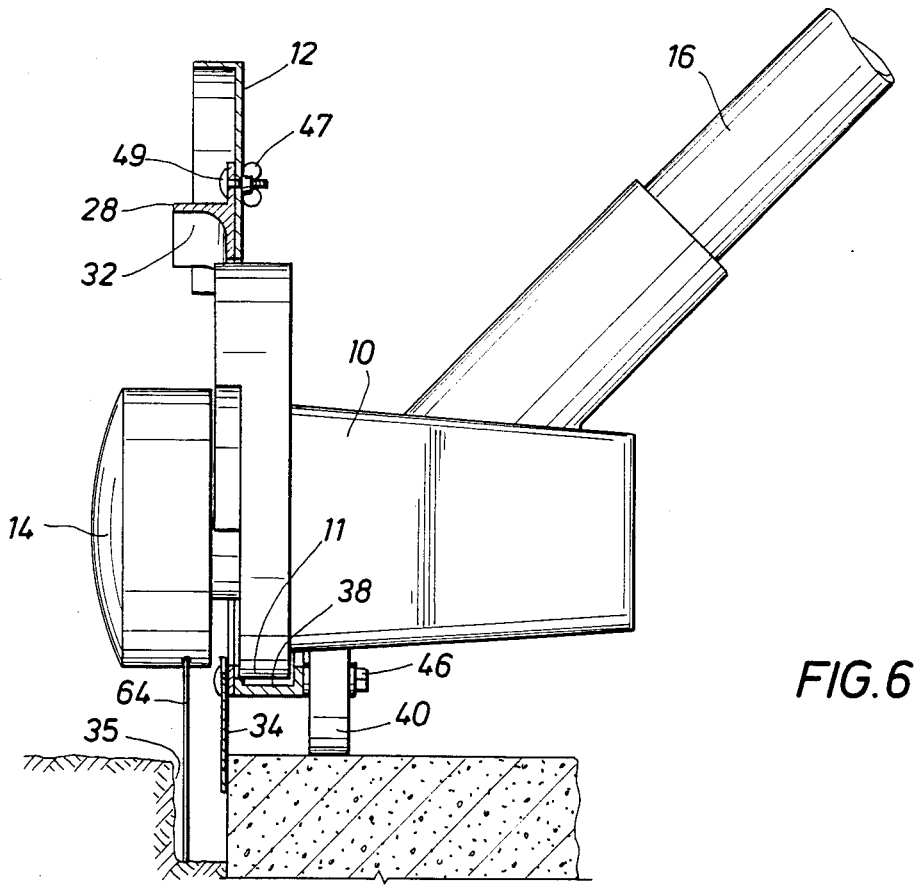
FIG. 6 is a partial sectional view of the lawn trimmer attachment of the invention taken along line 6—6 of FIG. 5.

Referring again to FIG. 2, an edge guide 34 is shown which extends below the edge 26 of the base plate 22. The edge guide 34 is mounted to the base plate 22 by mounting bolts 36. When using the apparatus of the invention, the edge guide 34 extends into a trench 35 formed between the lawn and the sidewalk or curb. The edge guide 34 engages the vertical side of the sidewalk or curb, as best shown in FIG. 6, for guiding the lawn trimmer in a straight path while edging. The trench 35 may be formed by any suitable means, as for example, with an edger having a metal blade, or the apparatus of the present disclosure. Once the tranch 35 is formed, it is easily maintained with regular use of the lawn edger of this invention.

Further details of the apparatus 20 are shown in FIGS. 3 and 4. The assembled apparatus 20 includes a bracket 38 and a pair of wheels 40. The wheels 40 are disposed in a parallel relationship with the back face 41 of the base plate 22. The bracket 38 separates the wheels 40 from the base plate 22. The lower assembly of the apparatus 20 comprising the edge guide 34, bracket 38, and wheels 40 is mounted to the base plate 22 by the bolts 36 which extend through aligned holes in the edge guide 34, bracket 38, and wheels 40. A bushing 42 is interposed between the bracket 38 and the wheels 40 about a bolt 36 enabling the wheels 40 to freely rotate about the bolts 36. A lock washer 44 and nut 46 secure the wheels 40 about the bolts 36.

The base plate 22 includes an aperture or hole 50 for receiving the spool and line housing 14 therethrough. The hole 50 is sized and shaped to the spool and surrounding structural projections on the shield plate 12 of the trimmer housing 10. The irregular shape of the hole 50 shown in FIG. 2 permits the base plate 22 to fit about an upstanding surrounding border around the spool and line housing 14 of the trimmer housing 10 shown in FIG. 1. It is understood that the size and shape of the hole 50 shown in FIG. 2 is for illustrative purposes only. The hole 50 may be circular, oblong, or any other shape permitting the base plate 22 to lie flat against the substantially flat surface of the shield plate 12. A tab 52 having a hole 54 extending therethrough provides a means for anchoring the top of the base plate 22 to the shield plate 12 of the trimmer housing 10.

Referring now to FIGS. 5 and 6, the apparatus 20 of the invention is shown mounted to a conventional, commercially available lawn trimmer. Prior to mounting the base plate 22, a hole is drilled through the upper portion of the shield plate 12 in alignment with the hole 54 formed in the tab 52 for receiving a bolt 49 therethrough.

Once a matching hole has been drilled in the shield plate 12, the apparatus 20 may be easily mounted to the trimmer housing 10. The nose portion 11 of the trimmer housing 10 is received in the bracket 38 as shown in FIG. 6. The base plate 22 is pressed against the shield plate 12 and the hole 54 is aligned with the hole previously formed through the upper portion of the shield plate 12. The bolt 49 is positioned so that it extends through the aligned holes. A wing nut 47 is threaded onto the bolt 49 extending through the shield plate 12 and hole 54 of the tab 52 anchors the upper end of the base plate 22 to the shield plate 12. In this manner, the base plate 22 is securely mounted to the motor housing 10 and the conversion of a lawn trimmer to a lawn edger is complete.

Figure 7:
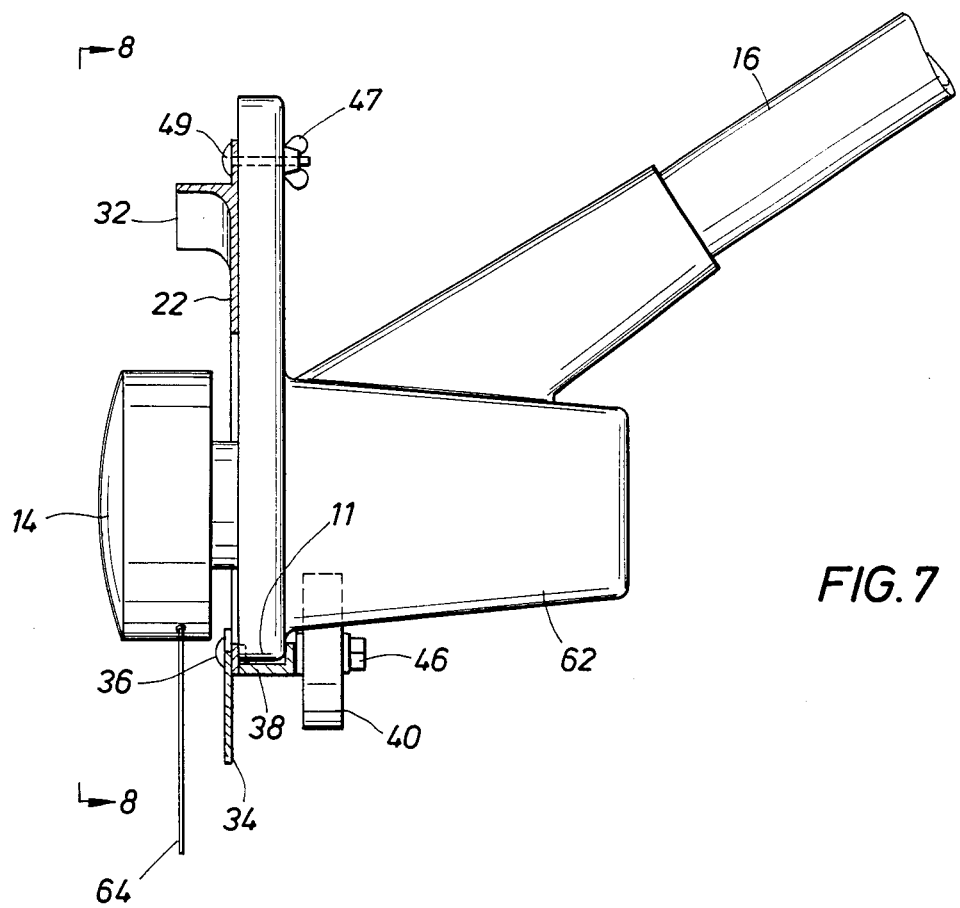
FIG. 7 is a partial sectional view of an alternate embodiment of the lawn trimmer attachment of the invention.
Figure 8:
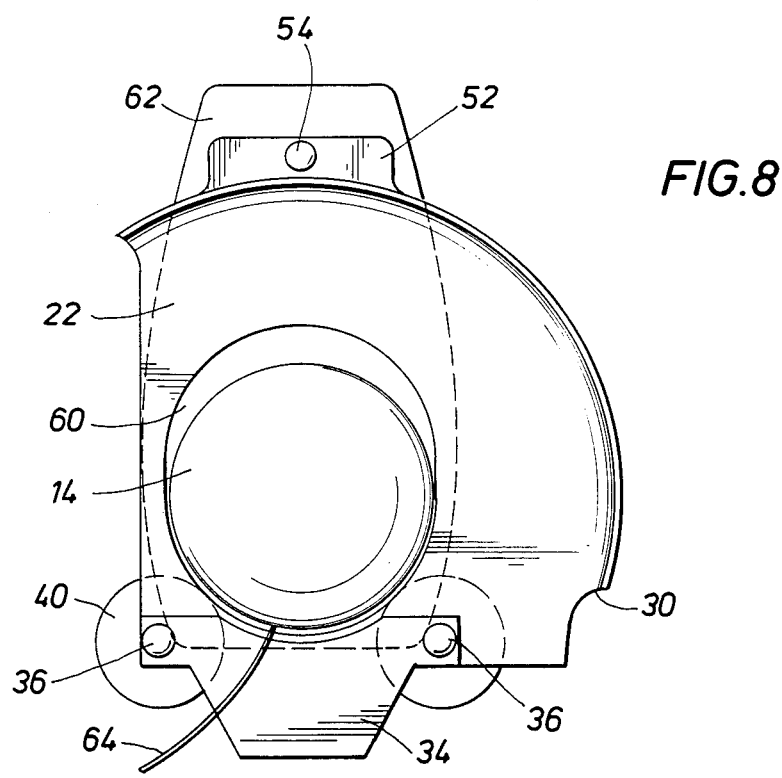
FIG. 8 is a side view of the alternate embodiment of the lawn trimmer attachment.

Referring now to FIGS. 7 and 8, an alternate embodiment of the lawn trimmer attachment of the invention is shown. The modified lawn trimmer attachment is substantially identical to the attachment 20 described and shown in FIGS. 1–4. Therefore, like reference numerals have been employed to identified like elements. In the alternate embodiment of FIGS. 7 and 8, the base plate 22 includes an oblong hole 60 for receiving the spool and line housing 14 therethrough. The oblong hole 60 is particularly suitable for some models of lawn trimmers, particularly earlier versions incorporating a housing 62 including a base which is oblong in profile. In the embodiment of FIGS. 7 and 8, the oblong hole 60 permits the spool and line housing 14 to be advanced through the opening 60 and the housing 62 lowered relative to the base plate 22 so that the nose portion thereof is received in the bracket 38. The oblong hole 60 permits the spool and line housing 14 to be moved vertically relative to the base plate 22 enabling the line trimmer attachment to be mounted to the base of housing 62. As in the embodiment of FIGS. 1–4, a hole drilled through the upper portion of the base of the housing 62 for receiving a bolt 49 therethrough to anchor the lawn trimmer attachment to the base of the housing 62 upon threading a wing nut 47 onto the bolt 49.

In use, the lawn trimmer is positioned so that the edge guide 34 extends into the trench 35 separating the sidewalk and lawn. The wheels 40 are sized so that the trimmer housing 10 and bracket 38 clear the surface of the sidewalk and do not drag therealong. If the nylon cord 64 is too long, it is cut off by the cord cutter 30 so that a substantially uniform depth is edged as the lawn trimmer is guided along the sidewalk. This results in a uniform and straight edge being cut. In addition, the nylon cord 64 lasts much longer since it does not strike the concrete sidewalk or curb.

While the foregoing is directed to the preferred embodiments of the present invention, other and further embodiments of the invention may be devised without departing from the basic scope thereof, and the scope thereof is determined by the claims which follow.

What is claimed is:

1. An attachment for converting a lawn trimmer into a lawn edger trimmer, the lawn trimmer including a housing enclosing a motor, a shield plate integrally formed with the motor housing and a spool and line housing projecting outwardly from the motor housing substantially perpendicular to the shield plate, the attachment comprising:

(a) a base plate detachably mounted to the motor housing in substantial planar contact with the motor housing shield plate, said base plate including a hole for receiving the spool and line housing therethrough;

(b) a deflection shield extending along an arcuate edge of said base plate, said deflection shield being integrally formed with said base plate and protruding outwardly therefrom, said deflection shield defining a curved surface projecting from said base plate for deflecting grass clippings and debris outwardly from said base plate;

(c) an edge guide depending downwardly from a bottom edge of said base plate for guiding the lawn trimmer along the path;

(d) bracket means mounted to said base plate for receiving a nose portion of the lawn trimmer housing therein;

(e) wheel means mounted to said bracket means and said base plate for rolling the lawn trimmer along the a path; and (f) means for mounting said base plate to the lawn trimmer housing.

2. The apparatus of claim 1 wherein said curved surface of said deflection shield is formed by a concave surface projecting from said base plate along said arcuate edge of said base plate for deflecting debris outwardly and away from said base plate.

3. The apparatus of claim 1 wherein said deflection shield includes a cord cutter edge formed at one end thereof.

4. The apparatus of claim 1 wherein said bracket means is sized to recieve a portion of the lawn trimmer therein, said bracket means cooperating with said mounting means to attach the attachment to the lawn trimmer.

5. The apparatus of claim 1 wherein said mounting means includes a bolt extending through aligned holes in said base plate and the lawn trimmer fastened by a wing nut threaded on said bolt.

6. The apparatus of claim 1 wherein said edge guide projects downwardly from said base plate into a trench formed along a sidewalk for engaging the sidewalk to guide the lawn trimmer along the sidewalk.

7. The apparatus of claim 1 wherein said edge guide, said bracket means, and said wheel means form a lower assembly mounted to said base plate by a pair of bolts extending through said lower assembly, said bolts providing an axis of rotation for said wheel means.

8. The apparatus of claim 1 wherein said hole in said base plate is irregularly shaped.

9. The apparatus of claim 1 wherein said hole in said base plate is oblong in shape.

* * * * *